United States Patent Office 3,689,481
Patented Sept. 5, 1972

3,689,481
BENZOXAZOLYL OPTICAL BRIGHTENING
AGENTS
Horst Scheuermann, Ludwigshafen, and Peter-Matthias Hell, Frankenthal, Germany, assignors to Badische Anilin- & Soda-Fabrik Aktiengesellschaft, Ludwigshafen am Rhine, Germany
No Drawing. Filed Dec. 30, 1970, Ser. No. 102,896
Claims priority, application Germany, Jan. 2, 1970, P 20 00 027.5
Int. Cl. C07d 91/32
U.S. Cl. 260—240 CA                              1 Claim

ABSTRACT OF THE DISCLOSURE

Optical brightening agents having the formula:

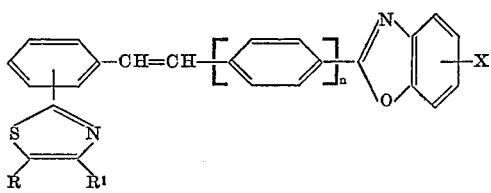

useful for the optical brightening of polyamides, cellulose esters and polyesters.

---

The invention relates to optical brightening agents having the general Formula I:

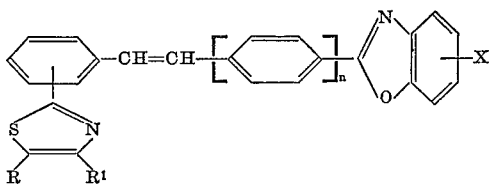

(1)

where R denotes hydrogen, carboxyl, carboalkoxy, carbamoyl or N-mono- or N,N-disubstituted carbamoyl;
$R^1$ denotes hydrogen, alkyl, phenyl or substituted phenyl;
R together with $R^1$ denotes an alkylene chain having three to five members;
X denotes hydrogen, chlorine, bromine, alkyl or alkoxy; and
$n$ denotes zero or 1.

Examples of carboalkoxy groups and substituted carbamoyl groups for R are: carbomethoxy, carboethoxy, carbobutoxy, N-β-hydroxyethylamide, N-methylamide, N-ethylamide, N-butylamide, N,N-dimethylamide, N,N-diethylamide, N,N-di-β-hydroxyethylamide, N-γ-dimethylaminopropylamide, N-β-ethylhexylamide or N-γ-dibutylaminopropylamide. Examples of $R^1$ (other than hydrogen) are methyl, ethyl, propyl, butyl, phenyl, methylphenyl, methoxyphenyl, chlorophenyl or dimethylphenyl.

R and $R^1$ may together denote for example a trimethylene, tetramethylene or pentamethylene chain. In addition to the radicals already specified, X may denote methyl, ethyl, n-propyl, isopropyl, n-butyl, tert-butyl, octyl, methoxy or ethoxy.

Compounds having the general Formula Ia:

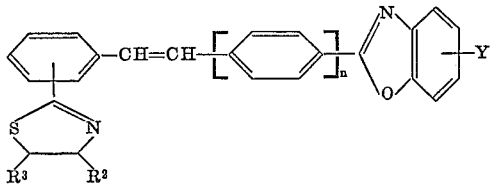

(Ia)

in which $R^2$ denotes hydrogen, methyl or phenyl;

$R^3$ denotes hydrogen, carbomethoxy, carboethoxy, carbobutoxy, carbamoyl or N-mono- or N-N-disubstituted carbamoyl;
Y denotes hydrogen, chlorine or alkyl having one to eight carbon atoms; and
$n$ denotes zero or 1,
are of special industrial importance.

Particularly signfiicant carbamoyl radicals are derived for example from the following amines: ethanolamine, diethanolamine and γ-dimethylaminopropylamine. The thiazole radical is preferably in the para-position or orthoposition to the vinyl grouping and Y is preferably in the para-position to the oxygen in the oxazole ring.

The compounds having Formula I where $n$ denotes zero may be prepared for example by first reacting a benzaldehyde having the formula

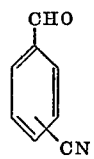

with a methylbenzoxazole having the general formula:

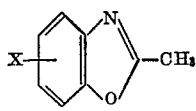

and converting the reaction product with hydrogen sulfide and a α-halocarbonyl compound into the compound having the Formula I.

Production of the compounds having the Formula I in which $n$ denotes 1 may proceed for example according to the equation:

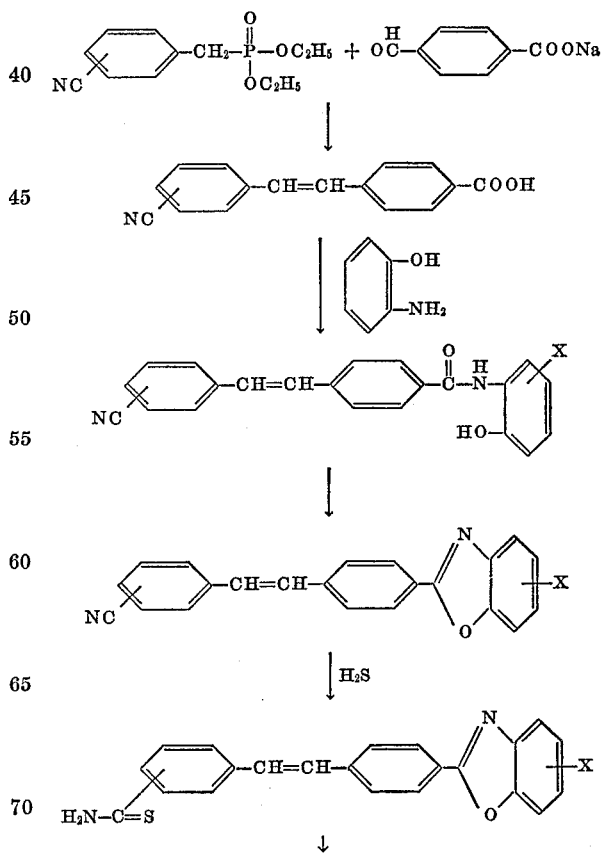

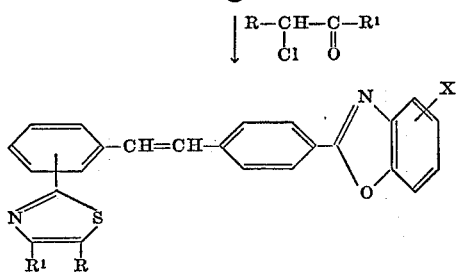

The individual stages in the reaction for the production of compounds having the Formula I are carried out by known methods which are described in the literature.

The new compounds are colorless to pale yellowish substances which are eminently suitable for the optical brightening of polyamides, cellulose esters such as secondary cellulose acetate or triacetate and particularly polyesters such as polyethylene glycol terephthalate or compounds having similar chemical constitution.

They are also suitable for mass brightening in the dope dyeing of polyamides, polyolefins and particularly polyesters.

The following examples illustrate the invention. Parts and percentages referred to in the following examples are by weight unless stated otherwise.

EXAMPLE 1

185 parts of 4'-cyanostilbene-4-carboxylic acid is suspended in 800 parts of o-dichlorobenzene and, while stirring, 110 parts of thionyl chloride is added. Then 3 parts of dimethylformamide is added and the whole is heated to 80° C. within three hours, kept at this temperature for one hour and then allowed to cool. Excess thionyl chloride is removed at subatmospheric pressure and 85 parts of o-aminophenol is gradually added to the solution. 64 parts of pyridine is then dripped in and the mixture is heated to 100° C. After cooling, 150 parts of ligroin is added and the whole is suction filtered. The product is washed with methanol, dilute hydrochloric acid and water and then dried. 222 parts of 4'-cyanostilbene-4-carboxylic acid-N-o-hydroxyphenylamide is obtained having the formula:

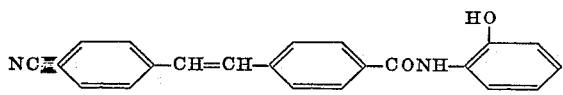

The crude product melts at from 235° to 242° C. and has adequate purity for further processing.

A mixture of 195 parts of 4'-cyanostilbene-4-carboxylic acid-N-o-hydroxyphenylamide, 500 parts of trichlorobenzene and 7 parts of zinc chloride is heated in an atmosphere of nitrogen for four hours at 210° to 215° C. while stirring. The cooled mixture is suction filtered, washed with methanol and water and dried. 161 parts of 4-benzoxazolyl-(2)-4'-cyanostilbene is obtained having the formula:

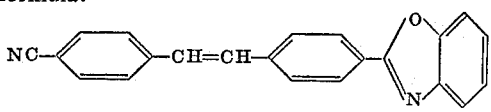

The crude produce has a melting point of 239° to 246° C. and is reacted without further purification.

Hydrogen sulfide is passed into a mixture of 82 parts of 4-benzoxazolyl-(2)-4'-cyanostilbene. 32 parts of triethylamine and 400 parts of N-methylpyrrolidone while stirring at 20° C. within five hours. The reaction mixture is then poured into 2000 parts of water and neutralized with dilute hydrochloric acid. The product is suction filtered and dried. After having been recrystallized from a mixture of equal parts of dimethylformamide and butyl acetate, the yield is 81 parts of 4-benzoxazolyl-(2)-stilbene-4'-thioamide having a melting point of 259° to 260° C. and the formula:

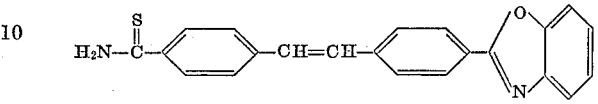

10.5 parts of α-chloroacetone is dripped while striring into 35.5 parts of this compound in 200 parts of N-methylpyrrolidone at 20° C. The solution is then heated for three hours at 80° C. and after having been cooled is poured into 1000 parts of water. Neutralization with aqueous sodium carbonate solution is carried out followed by suction filtration and washing with water. The product is recrystallized from 200 parts of dimethylformamide. 32 parts of 4-benzoxazolyl-(2)-4'-(4 - methylthiazolyl-(2))-stilbene is obtained having a melting point of 244° to 246° C. and the formula:

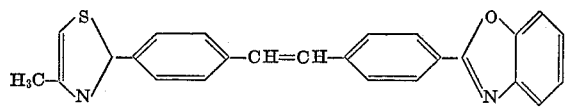

EXAMPLE 2

20 parts of α-chloroacetoacetic ester is dripped into a mixture of 35.5 parts of 4-benzoxazolyl-(2)-stilbene-4'-thioamide and 250 parts of N-methylpyrrolidone while stirring at 20° C. The mixture is then heated for five hours at 80° C. The product is precipitated in 1200 parts of water and neutralized with sodium carbonate solution, suction filtered and recrystallized from 100 parts of dimethylformamide. 34 parts of a pale yellow compound is obtained having a melting point of 206° to 208° C. and the formula:

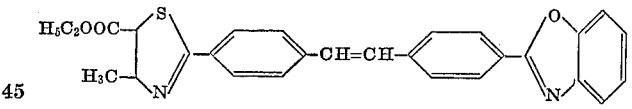

EXAMPLE 3

A mixture of 46.5 parts of 4-benzoazolyl-(2)-4'-(5-carboethoxy-4-methylthiazolyl-(2))-stilbene, 350 parts of ethanolamine and 1 part of a 30% solution of sodium methylate in methanol is heated for twenty hours at 115° to 120° C. while stirring. The product is precipitated in 2000 parts of water, suction filtered and washed with dilute hydrochloric acid and water. After drying, the compound is recrystallized from 110 parts of dimethylformamide. 38.5 parts of pale yellow crystals are obtained which sinter at 258° C. and melt at 288° to 290° C. The compound has the formula:

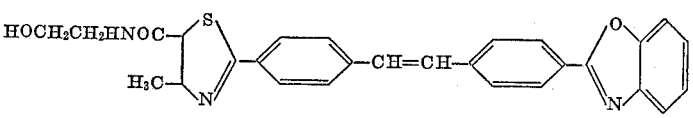

EXAMPLE 4

Hydrogen sulfide is passed into a mixture of 50 parts of 4-benzoxazolyl-(2)-2'-cyanostilbene (prepared analogously to Example 1), 20 parts of trimethylamine and 250 parts of N-methylpyrrolidone while stirring. The gas is passed in for two hours at 20° C. and then for three hours at 45° to 50° C. The solution is then poured into 2000 parts of water, neutralized with dilute hydrochloric acid, suction filtered and dried. 39 parts of the thioamide is obtained having the melting point 200° to 202° C. and the formula:

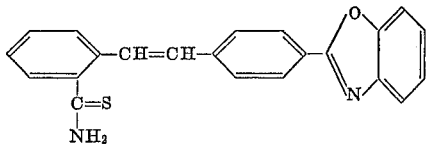

11.5 parts of α-chloroacetone is dripped at 20° C. while stirring into a solution of 35.5 parts of 4-benzoxazolyl-(2)-stilbene-2'-thioamide in 200 parts of N-methylpyrrolidone. The mixture is then stirred for another three hours at 80° C., poured into 1000 parts of water, neutralized with sodium carbonate solution, suction filtered and dried. The product is recrystallized from 300 parts of ethylene glycol monomethyl ether and 31 parts of pale yellow crystals are obtained having a melting point of 196° to 198° C. The compound has the formula:

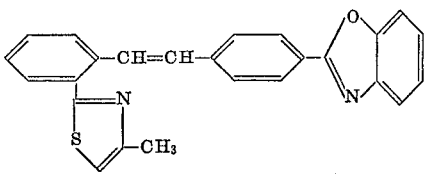

EXAMPLE 5

A solution of 21.5 parts of α-bromoacetophenone in 50 parts of N-methylpyrrolidone is dripped at 20° C. into a mixture of 37 parts of 4-(5-methylbenzoxazolyl-(2))-stilbene-4'-thioamide (prepared analogously to Example 1) and 250 parts of N-methylpyrrolidone while stirring. The whole is further stirred for one hour at 80° C. The product is then precipitated in 1000 parts of water, neutralized with sodium carbonate solution and suction filtered. After recrystallization from 400 parts of dimethylformamide, 38 parts of pale yellow crystals are obtained having a melting point of 254° to 256° C. The compound has the formula:

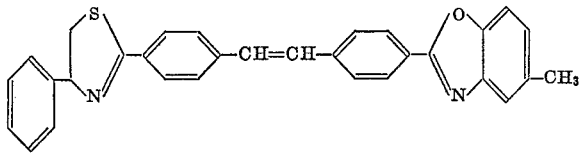

EXAMPLE 6

As described in Example 5, 37 parts of 4-(5-methylbenzoxazolyl-(2))-stilbene-4-thioamide is reacted with 24.5 parts of a 45% aqueous α-chloroacetaldehyde solution. After working up and recrystallization from 110 parts of dimethylformamide, 31 parts of a pale yellow compound is obtained having a melting point of 223° to 225° C. and the formula:

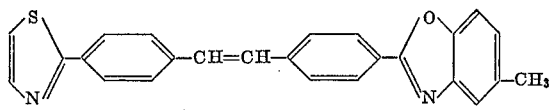

EXAMPLE 7

As described in Example 1, 4-(5-chlorobenzoxazolyl-(2))-stilbene-4'-thioamide is prepared and 39 parts of this thioamide is dissolved in 300 parts of N-methylpyrrolidone. 15 parts of α-chlorocyclohexanone is dripped in at 20° C. while stirring. The mixture is then stirred for another three hours at 80° C., worked up and recrystallized from 400 parts of dimethylformamide. 35 parts of pale yellow crystals obtained having a melting point of 265° to 268° C. The compound has the formula:

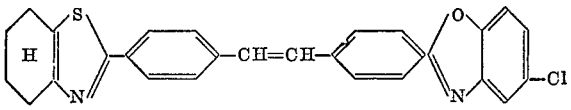

EXAMPLE 8

39 parts of 4-(5-chlorobenzoxazolyl-(2))-stilbene-4' thioamide is reacted with 22 parts of ω-bromoacetophenone as described in Example 5, and the product is worked up and recrystallized from 1200 parts of dimethylformamide. 42.5 parts of pale yellow crystals are obtained having a melting point of 273° to 275° C. The compound has the formula:

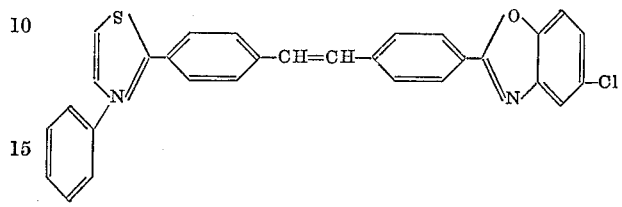

EXAMPLE 9

As described in Examples 1 and 4, 4-(5-chlorobenzoxazolyl-(2))-stilbene-4'-thioamide is prepared. 39 parts of this compound is reacted with 35 parts of a 45% aqueous solution of α-chloroacetaldehyde. The whole is worked up and recrystallized from 400 parts of ethylene glycol monomethyl ether. 24.5 parts of a pale yellow compound is obtained having a melting point of 200° to 202° C. and the formula:

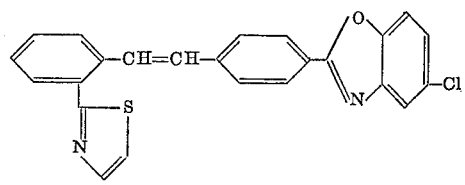

EXAMPLE 10

A mixture of 65.5 parts of p-cyanobenzaldehyde, 73.5 parts of 2-methylbenzoxazole, 1.5 parts of zinc chloride and 150 parts of o-dichlorobenzene is heated at 180° C. for ten hours. The whole is cooled, suction filtered and washed with methanol and water. 76 parts of a pale yellow to colorless compound is obtained having a melting point of 200° to 201° C. and the formula:

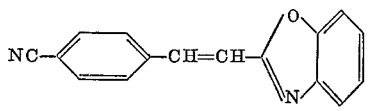

Hydrogen sulfide is passed into a solution of 54 parts of 2-p-cyanostyrylbenzoxazole, 200 parts of N-methylpyrrolidone and 28 parts of triethylamine while stirring within thirty minutes at 80° C. The whole is then poured into 1000 parts of water, neutralized with dilute hydrochloric acid and crude product is suction filtered. It is suspended in 120 parts of ethanol and the mixture is boiled under reflux for one hour, suction filtered and dried. 58 parts of the thioamide is obtained having a melting point of 202° to 205° C. and the formula:

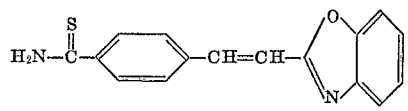

28 parts of this product is reacted in 120 parts of N-methyl-pyrrolidone with 14 parts of α-chloroacetone by the method already described, worked up and recrystallized from 150 parts of ethylene glycol monomethyl ether. 17 parts of a pale yellow compound is obtained having a melting point of 192° to 194° C. and the formula:

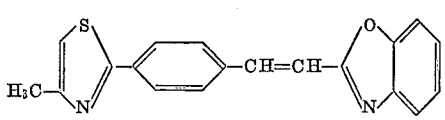

Other compounds may be prepared by methods analogous to those described in the above examples. They are set out in the following tables:

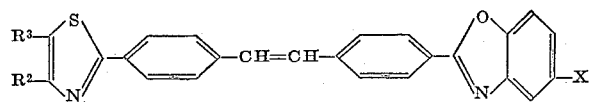

5

| X | R² | R³ |
|---|---|---|
| H | H | H |
| H | C₆H₅ | H |
| H | CH₃ | COOC₄H₉ |
| H | C₆H₅ | COOC₂H₅ |
| H | p-CH₃—C₆H₄ | COOC₂H₅ |
| H | CH₃ | CON(CH₃)₂ |
| H | CH₃ | CONH(CH₂)₃N(CH₃)₂ |
| H | CH₃ | CONH(CH₂)NH₂ |
| H | CH₃ | CON(CH₂CH₂OH)₂ |
| H | C₆H₅ | CONHC₄H₉ |
| CH₃ | CH₃ | H |
| CH₃ | C₄H₉ | COOCH₃ |
| CH₃ | 2,4-(CH₃)₂—C₆H₃ | COOC₂H₅ |
| CH₃ | CH₃ | CONH(CH₂)₃N(CH₃)₂ |
| CH₃ | CH₃ | CON(CH₂CH₂OH)₂ |
| CH₃ | p-CH₃O—C₆H₄ | CONHCH₂CH(C₂H₅)(CH₂)₃CH₃ |
| i-C₃H₇ | CH₃ | COOC₂H₅ |
| i-C₃H₇ | CH₃ | CONHC₂H₅ |
| tert-C₄H₉ | H | H |
| tert-C₄H₉ | CH₃ | H |
| tert-C₄H₉ | CH₃ | COOC₂H₅ |
| tert-C₄H₉ | p-Cl—C₆H₄ | COOC₄H₉ |
| tert-C₄H₉ | CH₃ | CONHCH₂CH₂OH |
| CH₃O | H | H |
| Cl | CH₃ | H |
| Cl | CH₃ | COOC₂H₅ |
| Cl | C₆H₅ | COOC₂H₅ |
| Cl | CH₃ | CONHCH₂CH₂OH |
| Br | H | H |

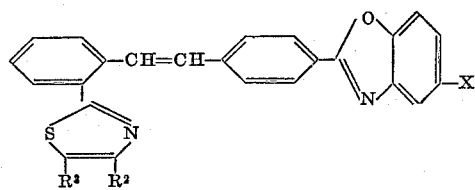

| X | R² | R³ |
|---|---|---|
| H | H | H |
| H | CH₃ | COOC₂H₅ |
| H | CH₃ | CON(CH₂CH₂OH)₂ |
| CH₃ | CH₃ | H |
| CH₃ | C₆H₅ | COOC₂H₅ |
| Cl | C₆H₅ | H |
| Cl | CH₃ | COOC₂H₅ |

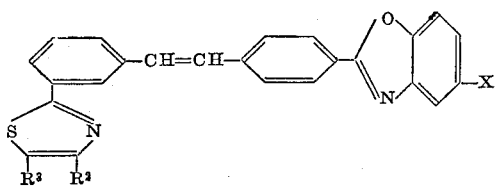

| X | R² | R³ |
|---|---|---|
| H | H | H |
| H | CH₃ | COOC₂H₅ |
| H | CH₃ | CON(CH₂CH₂OH)₂ |
| CH₃ | CH₃ | H |
| Cl | C₆H₅ | COOC₂H₅ |

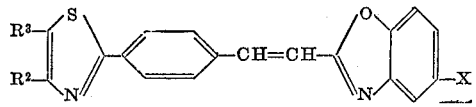

| X | R² | R³ |
|---|---|---|
| H | C₆H₅ | H |
| H | H | H |
| H | CH₃ | COOC₂H₅ |
| H | C₆H₅ | COOC₄H₉ |
| H | CH₃ | CONHCH₃ |
| H | CH₃ | CON(C₂H₅)₂ |
| H | C₆H₅ | CON(CH₂CH₂OH)₂ |
| CH₃ | H | H |
| CH₃ | CH₃ | COOC₂H₅ |
| CH₃ | C₆H₅ | COOC₂H₅ |
| tert-C₄H₉ | CH₃ | COOC₂H₅ |
| Cl | CH₃ | H |
| Cl | CH₃ | CONHCH₂CH₂OH |
| n-C₈H₁₇ | CH₃ | H |

We claim:
1. An optical brightening agent having the formula

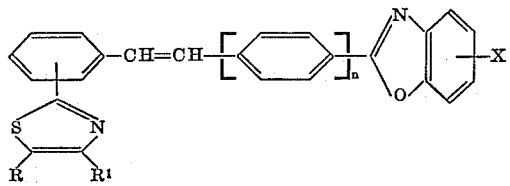

in which
R denotes hydrogen, carboxyl, carboalkoxy of 2 to 5 carbon atoms, carbamoyl, N-mono- or N,N-disubstituted alkylcarbamoyl, the alkyl moieties having together 1 to 8 carbon atoms, N-mono- or N,N-disubstituted hydroxyalkylcarbamoyl, the hydroxyalkyl moieties having 2 or 3 carbon atoms, N-monosubstituted aminoalkyl or dialkylaminoalkylcarbamoyl, the alkyl moieties having 1 to 4 carbon atoms; R¹ denotes hydrogen, alkyl of 1 to 4 carbon atoms, or phenyl, chlorophenyl, methylphenyl, methoxyphenyl or dimethylphenyl; R and R¹ together denote

—(CH₂)ₘ

*m* denotes 3, 4 or 5; and
X denotes hydrogen, chlorine, bromine, alkyl of 1 to 8 carbon atoms, methoxy or ethoxy.

References Cited

UNITED STATES PATENTS 3,351,591  11/1967  Siegrist et al. _____ 260—240 CA

FOREIGN PATENTS 20,226  11/1966  Japan _____ 260—240 D

JOHN D. RANDOLPH, Primary Examiner

U.S. Cl. X.R.

106—176; 260—75 NA, 78 S; 252 301.2 W; 260—240 D, 465 D